United States Patent [19]

Russell

[11] Patent Number: 4,944,242

[45] Date of Patent: Jul. 31, 1990

[54] RESCUE BALLOON

[76] Inventor: Donald H. Russell, P.O. Box 1282, Imperial Beach, Calif. 92032

[21] Appl. No.: 469,743

[22] Filed: Jan. 18, 1990

Related U.S. Application Data

[63] Continuation of Ser. No. 186,584, Apr. 27, 1988, abandoned, which is a continuation-in-part of Ser. No. 908,807, Sep. 17, 1986, abandoned.

[51] Int. Cl.$^5$ .............................................. B64B 1/50
[52] U.S. Cl. ............................ 116/210; 116/DIG. 9; 242/99
[58] Field of Search ................... 40/214, 215; 116/210, 116/DIG. 8, DIG. 9; 141/10, 19, 313, 330; 206/573, 803; 222/5; 242/96, 99; 244/31, 33, 153; 446/220, 222

[56] References Cited

U.S. PATENT DOCUMENTS

| | | | |
|---|---|---|---|
| 2,343,276 | 3/1944 | Carlson | 141/313 |
| 3,002,490 | 10/1961 | Murray | 116/210 |
| 3,094,807 | 6/1963 | Dorman | 446/222 |
| 3,154,050 | 10/1964 | Hanson | 116/210 |
| 3,310,024 | 3/1967 | McConnell | 116/210 |
| 3,395,877 | 8/1968 | MacFadden et al. | 244/33 |
| 3,727,229 | 4/1973 | Clinger et al. | 343/706 |
| 3,941,079 | 3/1976 | McNeill | 116/210 |
| 4,029,273 | 6/1977 | Christoffel, Jr. | 244/153 R |
| 4,094,267 | 6/1978 | Davis, Jr. | 116/210 |
| 4,195,794 | 1/1980 | Ricci et al. | 242/99 |
| 4,416,433 | 11/1983 | Bellina | 244/33 |
| 4,586,456 | 5/1986 | Forward | 116/210 |
| 4,696,252 | 9/1987 | Grill | 116/210 |
| 4,787,575 | 11/1988 | Stewart | 244/33 |
| 4,800,835 | 1/1989 | Mears | 116/210 |

FOREIGN PATENT DOCUMENTS

| | | | |
|---|---|---|---|
| 2415040 | 9/1979 | France | 244/33 |
| 8606041 | 10/1986 | PCT Int'l Appl. | 244/33 |

Primary Examiner—William A. Cuchlinski, Jr.
Assistant Examiner—W. Morris Worth
Attorney, Agent, or Firm—Calif Kip Tervo

[57] ABSTRACT

A location and signaling balloon device includes a lifting body balloon, a pressurized vessel of lighter-than-air gas and tethering apparatus for an inflated balloon. The tethering apparatus includes a tether line wound on a friction spool which is attached to a necked-down portion of the pressurized vessel. The friction spool prevents the tether line from freely paying out and snarling.

2 Claims, 2 Drawing Sheets

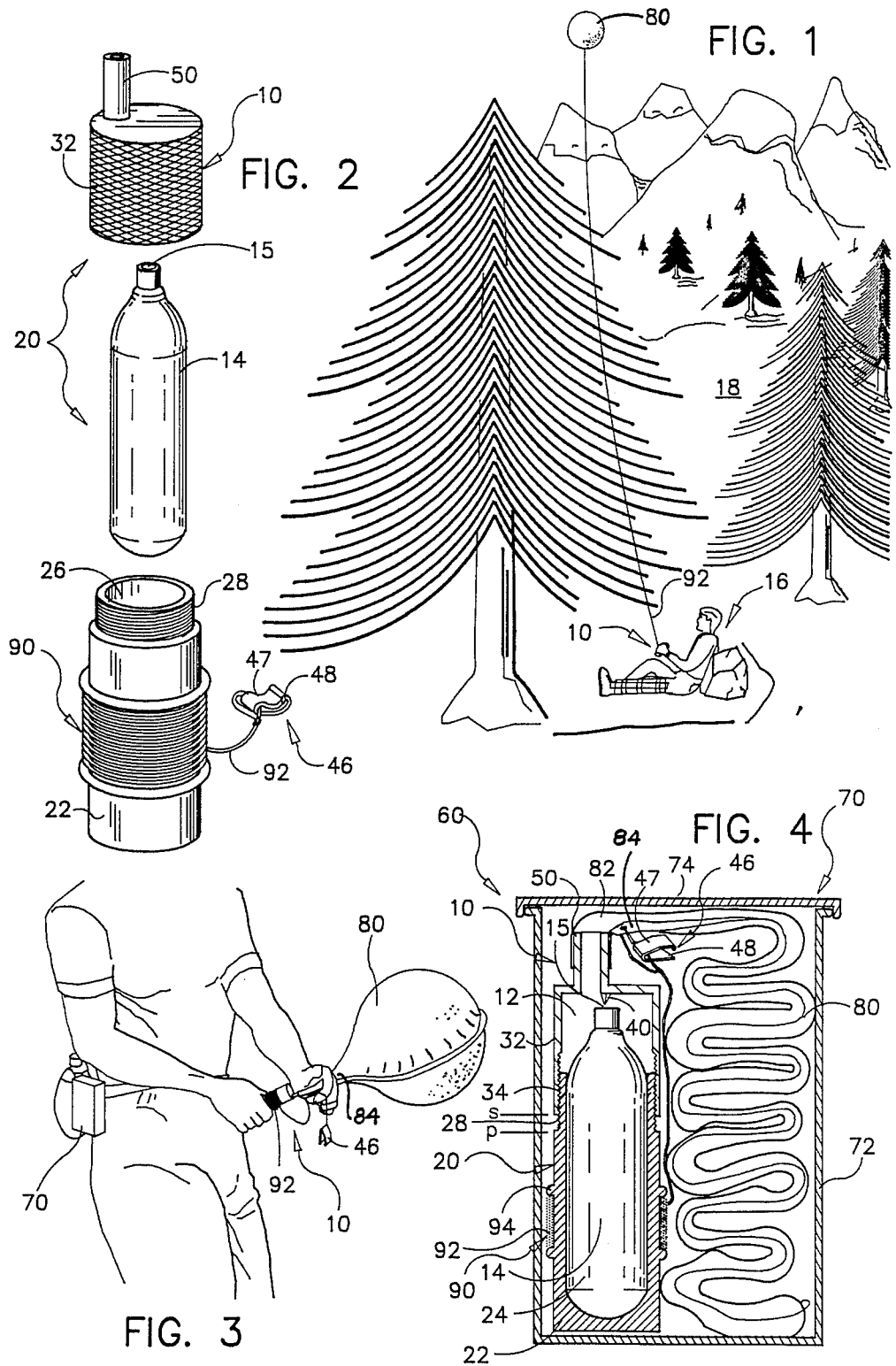

RESCUE BALLOON

CROSS REFERENCE TO RELATED APPLICATION

This application is a continuation of now abandoned application No. 186,584 filed Apr. 27, 1988 which was a continuation-in-part of now-abandoned application No. 908,807 filed Sept. 17, 1986, both abandoned.

BACKGROUND OF THE INVENTION

Field of the Invention

This invention relates in general to a signal and location device and more specifically to an extremely small, light-weight device for inflating and tethering a lighter-than-air balloon.

In the past many types of signal or rescue balloons have been proposed. These all have the same basic concept of filling a collapsed balloon with lighter-than-air gas from a pressure vessel and tethering the inflated balloon at a signal or rescue position. It has been proposed that these devices would aid in finding lost or injured hunters, hikers, boaters, aviators, and the like.

There are a number of disadvantages to the prior art devices. Although some may be suitable for use in conjunction with a vehicle, they are too large and too heavy to be easily carried by a hiker, skier, or hunter. Additionally, many prior art devices use valving means which are not compatible with the use and storage of helium gas, the principal useable gas. Helium would diffuse thru and leak around these valves; therefore these devices would have short and unreliable useful lifes.

Also, many of the prior art devices send aloft elements other than the balloon and tether line. This extra lifted weight requires a larger balloon and a larger gas vessel which means a larger heavier device.

A spherical balloon as used in prior art devices is not suitable for high wind conditions because the combination of wind drag and tether vectors pushes the balloon toward the ground.

Additionally, it is desirable to use plastic film as balloon material. Plastic film has good helium retention and is durable. Because plastic film does not expand as rubber or other common balloon materials do, plastic film can be coated with a highly reflective coating which greatly aids in sighting of the balloon. However, plastic film is relatively heavy and voluminous so its use in conjunction with the above-mentioned shortcomings of the prior art devices further exacerbates the deficiencies.

Therefore, there has been a need for an extremely small and light-weight rescue/location balloon device which can be carried on the person while hunting, hiking, skiing, or the like. It is particularly desirable that such a device have a long and reliable shelf life. It is further desirable that the device be simple and easy to use. It is particularly desirable that the device utilize a plastic film balloon and that it therefore send aloft minimal weight in addition to the balloon.

It is further desirable that the balloon be a lifting body for use in high wind situations.

SUMMARY OF THE INVENTION

According to the invention, a location and signaling balloon device comprises a balloon having a necked fillable end, a pressurized vessel of lighter-than-air gas retained in a housing, a clip for sealing the balloon, and means for tethering an inflated balloon. The housing comprises: a lower housing including a cylindrical cavity for slidably receiving and retaining the pressure vessel, and a threaded portion; and an upper housing having a threaded portion for attachment to the lower housing to define a chamber containing the vessel, a fluted needle on its inside end which pierces and ruptures the vessel upon sufficient engagement of the housings thereby releasing the gas, and an outlet tube which directs the gas from the chamber into the balloon. A small, light-weight clip seals the inflated balloon. A spool of light, strong line is superposed on the housing. The line, connected to the clip and housing, tethers the balloon in a signal or rescue position.

An alternate embodiment of the device uses a lifting body balloon with a tethering system that allows the balloon to be used in high wind situations. Small anchors attach the tether line to the balloon. A friction spool prevents tether line snarling.

Other features and many attendant advantages of the invention will become more apparent upon a reading of the following detailed description together with the drawings in which like reference numerals refer to like parts throughout.

BRIEF DESCRIPTION OF THE DRAWING

FIG. 1 is a schematic perspective view of an exemplary embodiment of the rescue balloon device in use.

FIG. 2 is an exploded perspective view of the device of FIG. 1.

FIG. 3 is a perspective view of a person using the device of FIG. 1 to inflate a balloon.

FIG. 4 is a sectional view of the device of FIG. 1 in kit form including a container.

FIG. 8b is a side view of the tether anchor of FIG. 8a.

DETAILED DESCRIPTION OF THE INVENTION

Figure 9:
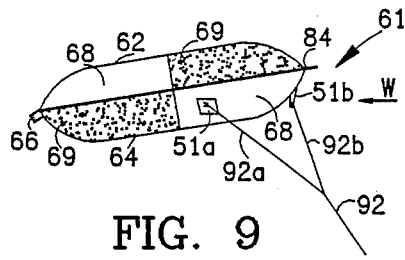
FIG. 9 is an enlarged view of the balloon of FIG. 5 shown tethered in the lifting body position.

With reference now to the drawing, and more particularly to FIG. 1 thereof, there is shown the rescue balloon device of the present invention in use. An injured hiker 16 in the forest 18 has inflated signal or rescue balloon 80 with lighter-than-air gas from device 10 and released the balloon which floats tethered by line 92 above surrounding trees so that it is visible from a distance and from the air. As can be seen, the device could aid in locating and rescuing lost or injured persons or as a signaling method by utilizing balloons of varying colors or markings.

With reference now to FIGS. 2 and 4, there are shown exemplary embodiments of the rescue balloon device, indicated generally as 10, of the present invention. FIG. 2 is an exploded view of the assembly of the device. FIG. 4 shows the device 10 as part of a kit including balloon 80 in container 70.

The device 10 comprises a housing, indicated generally as 20, for insertion and retention of a pressurized vessel 14 of lighter-than-air gas. The pressure vessel 14 contains a pressurized supply of lighter-than-air gas, preferably helium. Preferably, vessel 14 has an area, such as disk 15, which is rupturable to allow escape of the pressurized gas. It has been found that a cylindrical vessel three and one-half inches in length and three-fourths inches in diameter is sufficiently large. This is the size vessel commonly used to contain carbon dioxide for powering air rifles and seltzer bottles.

Housing 20 includes lower housing 22 and upper housing 32. As best seen in FIG. 2, housing 20 is preferably cylindrical in shape and is approximately four and one-half inches in length and an inch in diameter. Lower housing 22 has a cylindrical cavity 24 with upper opening 26 for insertion and retention of a pressurized vessel 14 of lighter-than air gas. Cavity 24 is designed to hold vessel 14 and positively position rupturable disk 15. Upper housing 32 fits over retained vessel 14 and releasably attaches to lower housing 22 by mating threaded portion 28 on lower housing 22 with threaded portion 34 on upper housing 32. Threaded portions 28,34 have sufficient interference fit to prevent excessive gas leakage. Housing 20 is preferably made of strong, light-weight plastic, but other materials, such as aluminum or the like could be used.

Tethering means for an inflated balloon include reel means, such as spool 90, upon which tether line 92 is wound. Spool 90 may be incorporated into the housing 20, such as into lower housing 22 as shown in FIG. 4, by use of enlarged annular flanges 94. The tethering means is attached to housing 20; either with spool 90 or with line 92. In this manner the device may serve as a tethering anchor. Line 92 is preferably attached at one end to spool 90 and at the other end to balloon sealing clip 46. Line 92 must be light in weight so that it does not drag down an inflated balloon; yet strong enough so as not to easily break because of tree branches or high winds. It has been found that a line 92 comprised of about three hundred feet of monofilament nylon line having a breaking strength of four pounds meets these criteria.

Clip 46 is extremely light-weight, spring loaded, and self-locking. Made of a single piece of material, such as tough resilient plastic, bent back on itself, clip 46 includes inner gate 47 and outer gate 48 joined by the spring bend. It is stored in the open position, as shown in FIGS. 3 and 4, to facilitate fixture to the balloon neck which it pinches sealed. As best seen in FIG. 4, an outlet tube 50 in the upper housing permits gas to escape from chamber 12. Also best seen in FIG. 4, a piercing means, such as fluted needle 40, is disposed on the inside end of upper housing 32.

In the storage position, pressurized vessel 14 is inserted into lower housing cavity 24 and upper housing 32 is threadably engaged to the storage position S whereby needle 40 adjoins rupturable disk 15. Further threading of upper housing 32 onto lower housing 22 to the puncture position P, causes needle 40 to pierce disk 15 and thereby release helium into chamber 12. The flutes aid in piercing the disk and in creating a hole which is not plugged by the needle. Outlet tube 50 is inserted into necked fillable end 82 of balloon 80 thereby allowing helium to pass from chamber 12 into the balloon.

FIG. 4 illustrates a kit 60 comprising a container 70 having lid 74 and a compartment 72 which holds the rescue balloon device 10 and a balloon 80 in a deflated and collapsed condition having a necked fillable end 82. It should be noted that the kit 60 is quite small and may be easily slipped into a pocket or pack, or may include belt mounting means and be carried as shown in FIG. 3. Balloon 80 includes means for receiving and retaining tether line 92. As illustrated in the prefered embodiment of FIGS. 3 and 4, balloon 80 is comprised of two sheets of plastic film. The sheets are joined around the periphery thereby creating a balloon having an annular sealing flange 84. Flange 84 has a reinforced hole therethru in the vicinity of necked fillable end 82 for receiving tether line 92 near to clip 46 so that clip 46 is retained in a position close to the neck to facilitate attachment of the clip to the neck of the filled balloon.

FIG. 3 shows rescue balloon kit 70 being worn on a person's belt. To use, the device 10 and balloon 80 is removed from container 70. One hand holds upper housing 32 and the balloon neck 82 onto outlet tube 50. The other hand turns lower housing 22, thereby threading the housings from the storage position to the puncture position and releasing the gas which fills the balloon. When the balloon is full, clip 46 is clipped across the balloon neck to seal it. The inflated balloon will then carry out line 92 or the person can feed it out to the height desired. Line 92 can be rewound on spool 90 to recall the balloon.

FIGS. 5–9 illustrate another exemplary embodiment of the rescue balloon device of the present invention. Wind drag on a conventional balloon which is tethered in the conventional manner will force the balloon toward the ground. A wind of only a few miles per hour will, for all practical purposes, force a bottom-tethered spherical balloon to the ground. The lifting body balloon embodiment of FIGS. 5–9 is specifically designed for use in high wind situations.

Figure 5:
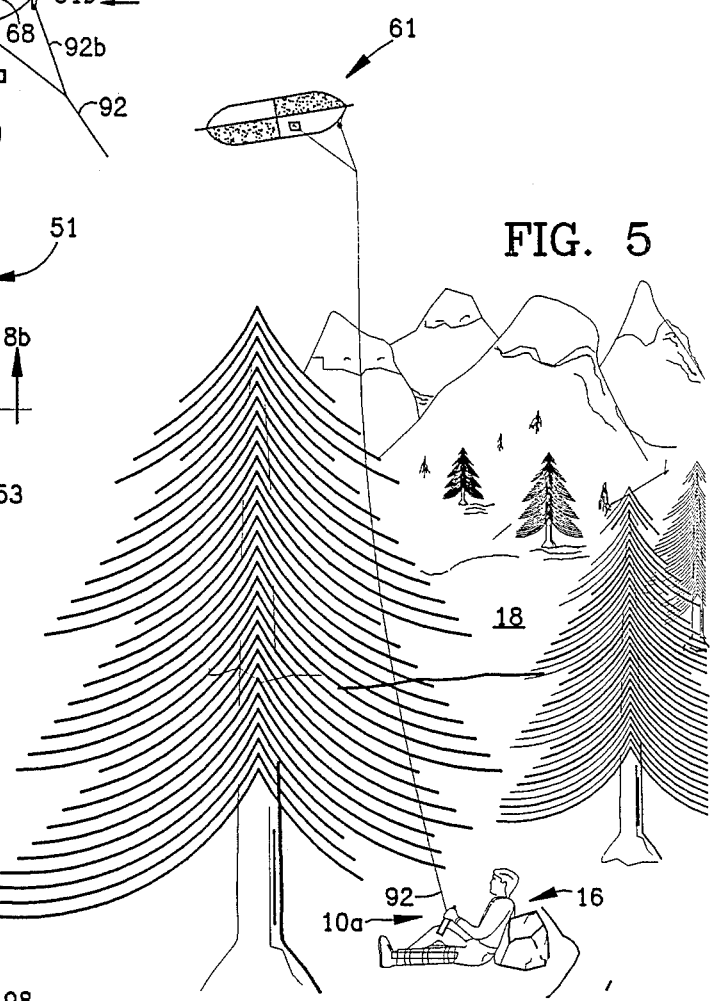
FIG. 5 is a schematic perspective view of a alternate exemplary embodiment of the rescue device of the invention in use.

FIG. 5 (similar to FIG. 1) illustrates the lifting body balloon device in use in a no-wind or low-wind situation. Injured hiker 16 in woods 18 holds the ground portion 10a of the device. Line 92 tethers lifting body balloon 61 to ground portion 10a.

FIG. 9 is a side view of an exemplary embodiment of the lifting body balloon of the present invention. Lifting body balloon 61 is non-spherical and may be tethered such that, in the wind, lift is produced which, in combination with the tethering force, tends to maintain the aloft balloon almost directly over its ground tether point.

The lifting body balloon 61 of FIG. 9 is referred to herein as of the "pancake" type and is constructed of top and bottom pieces 62, 64 of plastic film which are joined by means of a heat seal about their periphery to form annular sealing flange 84. Pieces 62, 64 are circular in top view. Lifting body balloon 61 includes a small light-weight self-sealing filling means 66. A lifting body balloon 61 having the features thus far described is available from Pioneer Balloons of Wichita, Kansas.

Lifting body balloon 61 preferably is partially coated with a reflective coating, such a mirrored surfaces 68, and partially coated with a bright color, such as international orange surfaces 69. Preferably, lifting body balloon 61 is comprised of plastic film, such as mylar, but can be comprised of various non-porous materials such as rubber, plastic, seal's bladder or other well-known balloon material. Balloon 61 may be brightly colored or marked and may be reflective. Additionally, the balloon should retain a gas, such as helium for several days and, preferably for as long as possible. A plastic film balloon has proven effective. Although plastic film is heavier than some other balloon materials, it retains helium for long periods and is more durable. Because plastic film does not expand it can be coated with a coating that reflects sunlight. Although a pancake configuration balloon if shown and described, other lifting body shapes, including flying wing shapes and other airfoils, are possible and are intended to be covered by the appended claims.

Figure 8A:
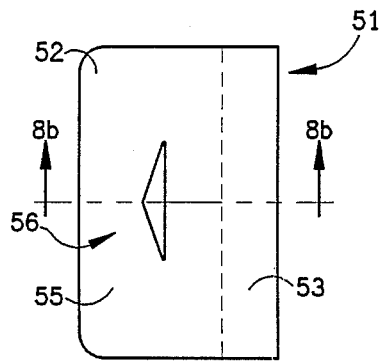
FIG. 8a is an enlarged top view of a tether anchor of FIG. 9.
Figure 8B:
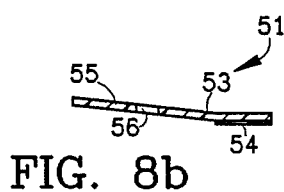

Lifting body balloon tethering means includes side tether anchors 51a (side tether anchor 51a on the side not seen is similarly located), nose tether anchor 51b, and side tether lines 92a, and nose tether line 92b connected to tether line 92. As best seen in FIGS. 8a and 8b, a tether anchor, denoted generally as 51, comprises a thin sheet 52 of strong flexible material, such as plastic. Attachment portion 53 includes a adherence means, such as glue 54, which melds to the mylar balloon surface. Tether line attachment means includes raised portion 55 having means, such as eye 56, for attachment of a tether line. Side and front tether lines 92a, 92b are of relative lengths such that lifting body balloon 61 is held in a position which provides lift when air is passing the balloon 61. In FIG. 9, the wind direction is designated by the W arrow.

Figure 7:
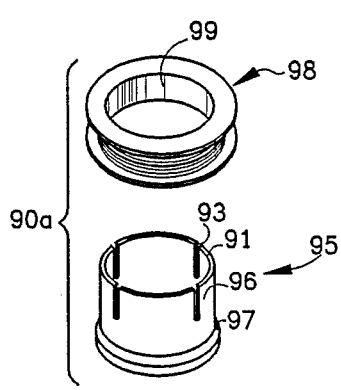
FIG. 7 is an enlarged exploded perspective view the tether spool of FIG. 6.
Figure 6:
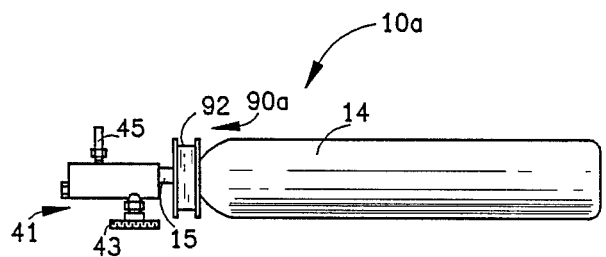
FIG. 6 is a side view of the gas vessel, valve and spool of the device of FIG. 5.

FIGS. 6 and 7 illustrate alternate exemplary embodiments of the filling and spooling apparatuses. In FIG. 6, pressure vessel 14 includes necked down portion 15 to which valve assembly, denoted generally as 41, is attached. Valve assembly 41 includes control valve knob 43 for releasing gas from vessel 14 and outlet tube 45 for injecting the gas into the balloon. Tether line friction spool 90a attaches to vessel 14. As best seen in FIG. 7, friction spool 90a comprises inner sleeve 95 for attachment to vessel 14, in this example to the neck portion 15, and rotating spool portion 98 upon which tether line 92 is wound. Inner sleeve 95 includes outer race 96, bottom flange 97, and upper rim 91. Upper rim 91 includes cuts 93 which allow the upper rim to be compressed inward to provide for attachment and friction fit of the rotating spool portion 98. Rotation spool portion 98 includes inner race for placement over inner sleeve outer race 96. One or both of the races 96, 99 may be slightly tapered such that friction between the races is enhanced. Friction spool 90 prevents line 92 from freely playing out.

From the foregoing description, it is seen that the present invention provides an extremely simple, efficient, and reliable manner of locating or signaling.

Although a particular embodiment of the invention has been illustrated and described, modifications and changes will become apparent to those skilled in the art, and it is intended to cover in the appended claims such modifications and changes as come within the true spirit and scope of the invention.

What I claim is:

1. A rescue or signaling device comprising, in combination:
    a lifting body balloon including filling means and sealing means;
    a pressurized vessel of lighter-than-air gas including a necked down portion;
    valving means attached to said pressurized vessel necked down portion for filling said lifting body balloon with lighter-than-air gas from said pressure vessel; and
    tethering means attached to said lifting body balloon for tethering said filled lifting body balloon such that air flowing past said balloon when tethered produces a lifting force; said tethering means including:
    a tether line; and
    a friction spool upon which said tether line is wound; said friction spool attached to said pressurized vessel necked down portion for preventing said tether line from freely playing out.

2. The rescue device of claim 1 wherein:
    said friction spool comprises:
    an inner sleeve attached to said pressurized vessel necked down portion; and
    a rotating spool portion frictionally fitted over said inner sleeve for rotating relative to said inner sleeve; wherein said tether line is wound on said rotating spool portion.

* * * * *